(12) United States Patent
Gottmann et al.

(10) Patent No.: US 8,968,509 B2
(45) Date of Patent: Mar. 3, 2015

(54) METHODS AND DEVICES FOR PRINTING SEALS FOR FUEL CELL STACKS

(71) Applicant: Bloom Energy Corporation, Sunnyvale, CA (US)

(72) Inventors: Matthias Gottmann, Sunnyvale, CA (US); Stephen Couse, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 15 days.

(21) Appl. No.: 13/890,555

(22) Filed: May 9, 2013

(65) Prior Publication Data

US 2014/0332145 A1   Nov. 13, 2014

(51) Int. Cl.
| | |
|---|---|
| B29C 65/54 | (2006.01) |
| B32B 37/12 | (2006.01) |
| B32B 38/14 | (2006.01) |
| B32B 43/00 | (2006.01) |
| C08J 5/12 | (2006.01) |
| C09J 5/02 | (2006.01) |
| C09J 5/04 | (2006.01) |
| H01M 8/02 | (2006.01) |
| H01M 8/24 | (2006.01) |

(52) U.S. Cl.
CPC .......... *H01M 8/0286* (2013.01); *H01M 8/2485* (2013.01)
USPC ..................... 156/277; 156/307.1; 156/307.3; 156/307.7; 429/171; 429/173; 429/185

(58) Field of Classification Search
USPC ......... 156/277, 307.1, 307.3, 307.7; 429/171, 429/173, 185, 469
See application file for complete search history.

(56) References Cited

U.S. PATENT DOCUMENTS

| | | | |
|---|---|---|---|
| 3,615,851 A | 10/1971 | Eysel | |
| 3,696,742 A * | 10/1972 | Parts et al. | 101/128.4 |
| 4,256,796 A | 3/1981 | Hang et al. | |
| 4,301,324 A | 11/1981 | Kumar et al. | |
| 5,589,285 A | 12/1996 | Cable et al. | |
| 5,948,221 A | 9/1999 | Hsu | |
| 5,972,285 A | 10/1999 | Knott | |
| 6,096,451 A | 8/2000 | Shiratori et al. | |
| 6,271,158 B1 | 8/2001 | Xue et al. | |
| 6,280,869 B1 | 8/2001 | Chen | |
| 6,302,402 B1 | 10/2001 | Rynders et al. | |
| 6,430,966 B1 | 8/2002 | Meinhardt et al. | |
| 6,492,053 B1 | 12/2002 | Donelson et al. | |
| 6,532,769 B1 | 3/2003 | Meinhardt et al. | |
| 6,605,316 B1 | 8/2003 | Visco et al. | |

(Continued)

OTHER PUBLICATIONS

Gunther et al., "The Stability of the Sealing Glass AF 45 in $H_2/H_2O$—and $O_2/N_2$—Atmospheres," Electrochemical Proceedings, 1997, vol. 97-18, pp. 746-764.

(Continued)

*Primary Examiner* — Sing P Chan
(74) *Attorney, Agent, or Firm* — The Marbury Law Group PLLC

(57) ABSTRACT

Various embodiments include a fuel cell stack seal application method including the step of applying a seal paste to a fuel cell, placing the fuel cell in a fuel cell stack, and thermally treating the fuel cell stack to set the seal paste into a seal. Further embodiments include applying the seal paste to an interconnect using stencil printing.

17 Claims, 15 Drawing Sheets

(56) References Cited

U.S. PATENT DOCUMENTS

| | | | |
|---|---|---|---|
| 6,635,375 | B1 | 10/2003 | Geisbrecht et al. |
| 6,656,625 | B1 | 12/2003 | Thompson et al. |
| 6,692,859 | B2 | 2/2004 | Mukerjee et al. |
| 6,740,441 | B2 | 5/2004 | Jacobson et al. |
| 6,902,798 | B2 | 6/2005 | Ghosh et al. |
| 7,144,651 | B2 | 12/2006 | Finn et al. |
| 7,931,997 | B2 | 4/2011 | Gottmann et al. |
| 8,110,319 | B2 | 2/2012 | Nguyen et al. |
| 8,497,047 | B2 * | 7/2013 | Larsen et al. ............ 429/469 |
| 2002/0055028 | A1 | 5/2002 | Ghosh et al. |
| 2003/0157386 | A1 | 8/2003 | Gottmann et al. |
| 2003/0203267 | A1 | 10/2003 | Chou et al. |
| 2003/0215689 | A1 | 11/2003 | Keegan |
| 2003/0224238 | A1 | 12/2003 | Finn et al. |
| 2004/0072039 | A1 | 4/2004 | Jankowski et al. |
| 2005/0175882 | A1 | 8/2005 | Sasahara et al. |
| 2006/0096632 | A1 | 5/2006 | Oswald |
| 2006/0246333 | A1 | 11/2006 | Schaevitz et al. |
| 2007/0003821 | A1 | 1/2007 | Belchuk |
| 2007/0037058 | A1 | 2/2007 | Visco et al. |
| 2008/0026280 | A1 | 1/2008 | Thompson et al. |
| 2008/0131739 | A1 | 6/2008 | Badding et al. |
| 2009/0065042 | A1 | 3/2009 | Reynolds |
| 2009/0286664 | A1 | 11/2009 | Drake et al. |
| 2010/0119917 | A1 | 5/2010 | Kumar et al. |
| 2010/0159344 | A1 | 6/2010 | Gottmann et al. |
| 2010/0239937 | A1 | 9/2010 | Janousek et al. |
| 2010/0317147 | A1 * | 12/2010 | Bettinelli ............... 438/98 |
| 2012/0227597 | A1 * | 9/2012 | Meeus et al. ............ 101/126 |

OTHER PUBLICATIONS

T. Schwickert et al., "Glass-Ceramic Materials as Sealants for SOFC Applications," Materiaswiss Werkstofftech, v 33, pp. 363-360 (2002).

Yang et al., "Chemical Interactions of Barium—Calcium—Aluminosilicate-Based Sealing Glasses with Oxidation Resistant Alloys," Solid State Ionics, vol. 160, (2003), pp. 213-225.

Larsen et al., "The Influence of $SiO_2$ Addition to $2MgO$—$Al_2O_3$—$3.3P_2O_5$ Glass," J. Non. Cryst. Solids, vol. 244, 1999, pp. 16-24.

Pyke et al., "Planar SOFC Technology: Stack Design and Development for Lower Cost and Manufacturability," DTI/Pub URN 02/1350, 2002, 43pgs.

Ohara et al., "A New Sealant Material for Solid Oxide Fuel Cells Using Glass-Ceramic," J. Ceram. Soc. Japan, vol. 109, 2001, No. 3, pp. 186-190.

Eichler et al., "BAS ($BaO$—$Al_2O_3$—$SiO_2$)—Glasses for High Temperature Applications," Journal of the European Ceramic Society, vol. 19, 1999, pp. 1101-1104.

Flugel et al., "Development of an Improved Devitrifiable Fuel Cell Sealing Glass," Journal of the Electrochemical Society, vol. 154 (6), 2007, pp. B601-B608.

Sohn et al., "Stable Sealing Glass for Planar Solid Oxide Fuel Cell," Journal of Non-Crystalline Solids, vol. 297, 2002, pp. 103-112.

J. Stevenson, "SOFC Seals: Materials Status," SECA Core Technology Program—SOFC Seal Meeting, Jul. 8, 2003, pp. 1-28.

K. L. Ley, "Glass-Ceramic Sealants for Solid Oxide Fuel Cells: Part I. Physical Properties," J. Mater. Res., vol. 11, No. 6, Jun. 1996, pp. 1489-1493.

Bansal et al., Mechanical Properties of Solid Oxide Fuel Cell Seal Glass Enhanced by Boron Nitride Nanotubes, NASA Glenn Research Center (2005), pp. 155-156.

Zheng et al., "$SiO_2$—$CaO$—$B_2O_3$—$Al_2O_3$ Ceramic Glaze as Sealant for Planar ITSOFC," Journal of Power Sources, vol. 128, 2004, pp. 165-172.

Choi et al., "Mechanical Behavior of Solid Oxide Fuel Cell (SOFC) Seal Glass—Boron Nitride Nanotubes Composite," Advances in Solid Oxide Fuel Cells II: Ceramic Engineering and Science Proceedings, vol. 27, Issue 4, Chapter 30, (eds N.P. Bansal, et al.), © 2007 American Ceramics Society.

Bansal et al., "Crystallization Kinetics of a Solid Oxide Fuel Cell Seal Glass by Differential Thermal Analysis," NASA Glenn Research Center, NASA/TM-2005-213436, Jan. 2005, pp. 1-14.

* cited by examiner

METHODS AND DEVICES FOR PRINTING SEALS FOR FUEL CELL STACKS

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate conduits between the stack and the manifold housing in which the stack is located.

Fuel cell stacks are frequently built from a multiplicity of cells in the form of planar elements, tubes, or other geometries. Fuel and air has to be provided to the electrochemically active surface, which can be large. One component of a fuel cell stack is the so called gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate which functions as an interconnect is made of or contains an electrically conductive material.

Fuel cell stacks, particularly those with planar geometry, often use seals between electrolyte and interconnect surfaces to contain fuel and air at various locations within the stack. While it is desirable for seals to be effective at start up temperatures to prevent escape (and potential ignition) of fuel gasses, these seals must maintain their operating integrity at high operating temperatures and in an oxidizing, reducing, or mixed (i.e., oxidizing on one side on one side of the seal and reducing on the other) environment. Expansion and contraction of fuel cell stack components (including seals) due to thermal cycling or compression should not result in damage to any of the components during a seal's expected life.

SUMMARY

The various embodiments provide a fuel cell stack seal application method including the step of applying a seal paste to a fuel cell, placing the fuel cell in a fuel cell stack, and thermally treating the fuel cell stack to set the seal paste into a seal. Further embodiments include applying the seal paste by screen printing, stencil printing, or dispensing through the seal paste through a nozzle.

Further embodiments include a fuel cell seal application method including applying a seal paste to an interconnect using stencil printing.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide methods of forming seals in fuel cell stacks by applying a paste to a fuel cell component, such as an interconnect or a fuel cell, and thermally treating the paste to form a seal. For example, the paste may include a glass ceramic or glass powder in an organic binder. Thermal treatment may include burnout of the binder and melting of glass or glass ceramic to the set the seal after the component is placed into a fuel cell stack. The seal paste may be applied in various ways, such as screen printing or stencil printing. In further embodiments, multiple screen or stencil prints may be performed, such as using multiple stencils to form one or more seals.

The various embodiments described herein may provide advantages over prior methods of forming fuel cell seals, such as providing more accurate application of seal paste at a lower cost and higher production volume.

In various embodiment, seals may be constructed in any geometric shape. For example, a SOFC stack may contain multiple solid oxide fuel cells, interconnects, and manifolds for fuel and/or air. At the junction of each of these components, a distinctively shaped seal may be required to maintain an effective seal at typical operating temperatures. Exemplary geometric shapes include rings (i.e., "donuts"), strips, rectangles (i.e., "windows"), or any combination thereof.

The various embodiment seals may withstand the high temperatures and thermal cycling that occurs in the hot area of the fuel cell system or inside a fuel cell system's insulated hot box (e.g., with temperatures up to 1000° C. or higher) without leaking or otherwise failing. Embodiment seals should also withstand the cycling of expansion and contraction resulting from heating and cooling of the fuel cell system, such as cycling between temperatures from 24° C. to 1000° C.

In various embodiments, SOFC seal members may have similar CTE to other components of the SOFC stack in order to minimize mechanical stresses that would otherwise lead to cell cracking and delamination during thermal cycling.

Figure 1:
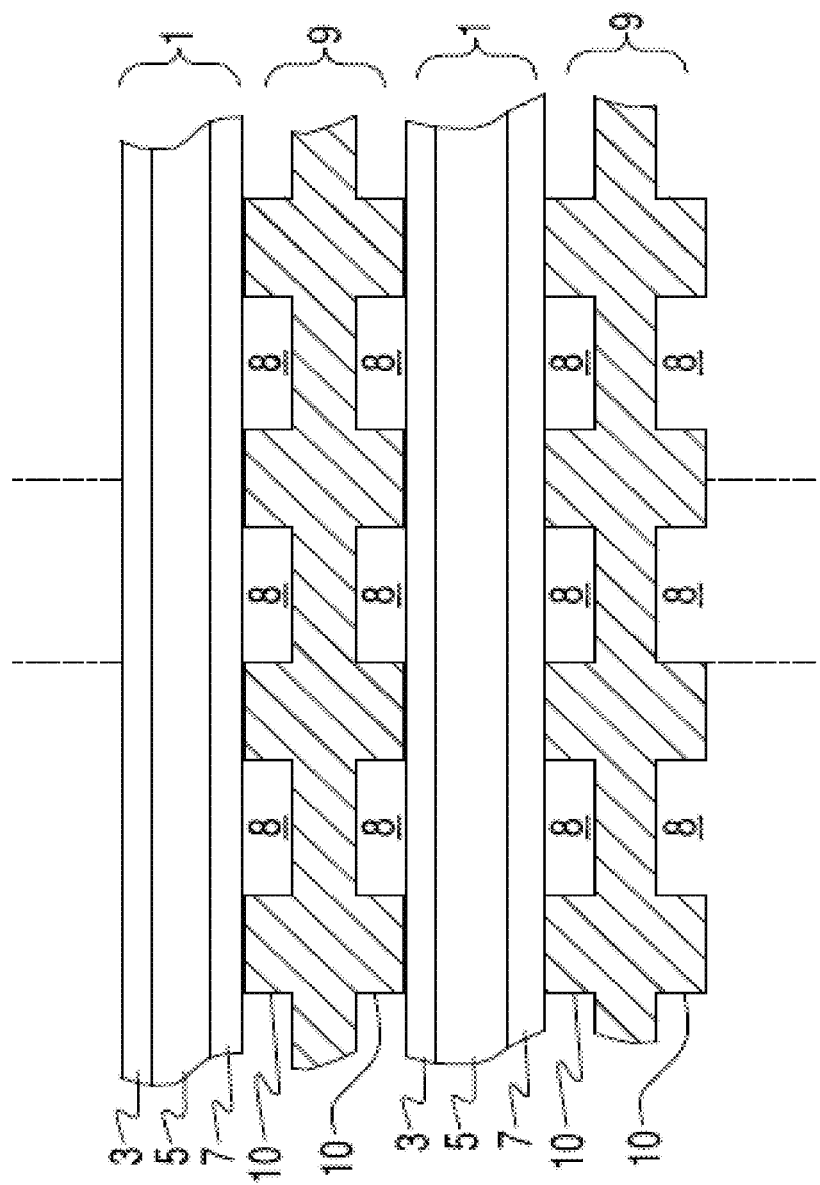
FIG. 1 illustrates a side cross-sectional view of a SOFC stack.

FIG. 1 illustrates a solid oxide fuel cell (SOFC) stack in which each SOFC 1 comprises a cathode electrode 3 (e.g., LSM or other conductive perovskites), a solid oxide electrolyte 5 (e.g., YSZ, ScSZ, or doped ceria), and an anode electrode 7 (e.g., a cermet such as a nickel-stabilized zirconia and/or doped ceria cermet).

Various materials may be used for the cathode electrode 3, electrolyte 5, and anode electrode 7. For example, the anode electrode may comprise a cermet comprising a nickel containing phase and a ceramic phase. The nickel containing phase may consist entirely of nickel in a reduced state. This phase may form nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte may comprise a stabilized zirconia, such as scandia stabilized zirconia (SSZ) or yttria stabilized zirconia (YSZ). Alternatively, the electrolyte may comprise another ionically conductive material, such as a doped ceria.

The cathode electrode may comprise an electrically conductive material, such as an electrically conductive perovskite material, such as lanthanum strontium manganite (LSM). Other conductive perovskites, such as LSCo, etc., or metals, such as Pt, may also be used. The cathode electrode may also contain a ceramic phase similar to the anode electrode. The electrodes and the electrolyte may each comprise one or more sublayers of one or more of the above described materials.

Fuel cell stacks are frequently built from a multiplicity of SOFC's 1 in the form of planar elements, tubes, or other geometries. Although the fuel cell stack in FIG. 1 is vertically oriented, fuel cell stacks may be oriented horizontally or in any other direction. Fuel and air may be provided to the electrochemically active surface, which can be large.

The gas flow separator 9 (referred to as a gas flow separator plate when part of a planar stack), containing gas flow passages or channels 8 between ribs 10, separates the individual cells in the stack. The gas flow separator plate separates fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 7 of one cell to the cathode or air electrode 3 of the adjacent cell. In this case, the gas flow separator plate which functions as an interconnect is made of or contains electrically conductive material. FIG. 1 shows that the lower SOFC 1 is located between two interconnects 9.

Interconnects may be made of or may contain electrically conductive material, such as a metal alloy (e.g., chromium-iron alloy) or an electrically conductive ceramic material, which optionally has a similar coefficient of thermal expansion to that of the solid oxide electrolyte in the cells (e.g., a difference of 0-10%). An electrically conductive contact layer, such as a nickel contact layer, may be provided between the anode electrode and the interconnect. Another optional electrically conductive contact layer may be provided between the cathode electrode and the interconnect.

The plurality of fuel cells in a fuel cell stack may share a common fuel inlet and exhaust passages or risers. A fuel cell stack may include a distinct electrical entity which contains two end plates on opposite ends of the stack which are connected to power conditioning equipment and the power (i.e., electricity) output of the stack. Thus, in some configurations, the electrical power output from such a distinct electrical entity may be controlled separately from other stacks. In other embodiments, multiple stacks may share the same end plates. In this case, the stacks may jointly comprise a distinct electrical entity (e.g., a column of stacks).

A fuel cell stack may be part of a larger fuel cell system for generating power. The fuel cell stack may be located in a hot zone within such a system. During normal operation, this hot zone may operate at a high temperature, such as a temperature of about 600° C. or more, e.g., 600-1000° C., such as 750-950° C.

Figure 2:
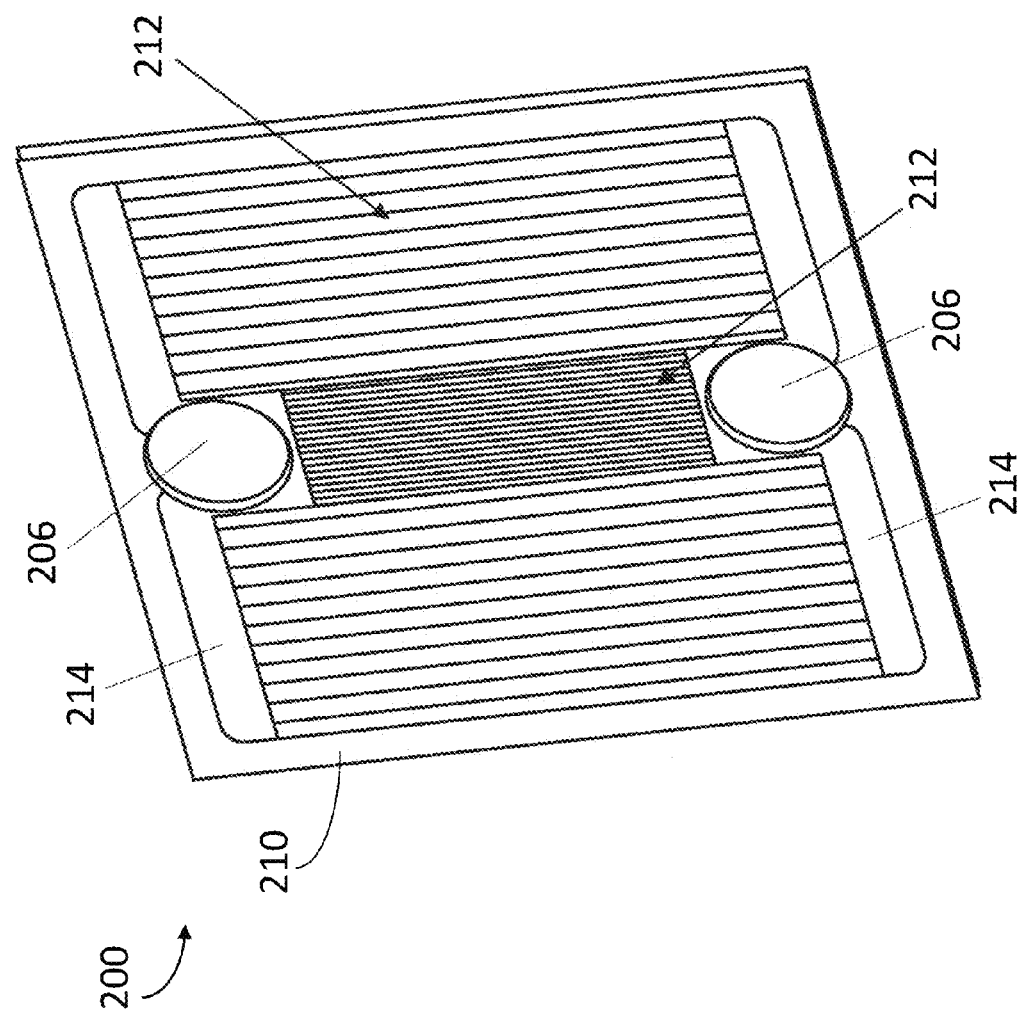
FIG. 2 is a three dimensional view of a fuel side of an embodiment interconnect for a SOFC stack with a window barrier seal.

FIG. 2 illustrates the fuel side of the interconnect 200. A hollow rectangle "window" seal 210 is located around the outside edge of the interconnect 1. Also shown are fuel riser openings 206, fuel distribution plenums 214 and fuel flow grooves 212. The interconnect shown in FIG. 2 has two sizes of fuel flow grooves 212, but alternate embodiments could use a single size and any number of sizes of fuel flow grooves. For example, the fuel side of an interconnect may have fuel flow grooves 212 that are all the same depth and length, or a combination of short and long, and/or deep and shallow grooves.

The air side of the interconnect 200 may contact a cathode of one cell in the stack while the fuel side of interconnect 200 may contact an anode of the adjacent cell. Fuel may flow in or out of fuel riser openings 206 and through the fuel flow grooves 212 passing by the anode of the adjacent cell. The seal 210 may contact a fuel cell or another interconnect and prevent the fuel from escaping.

Figure 3:
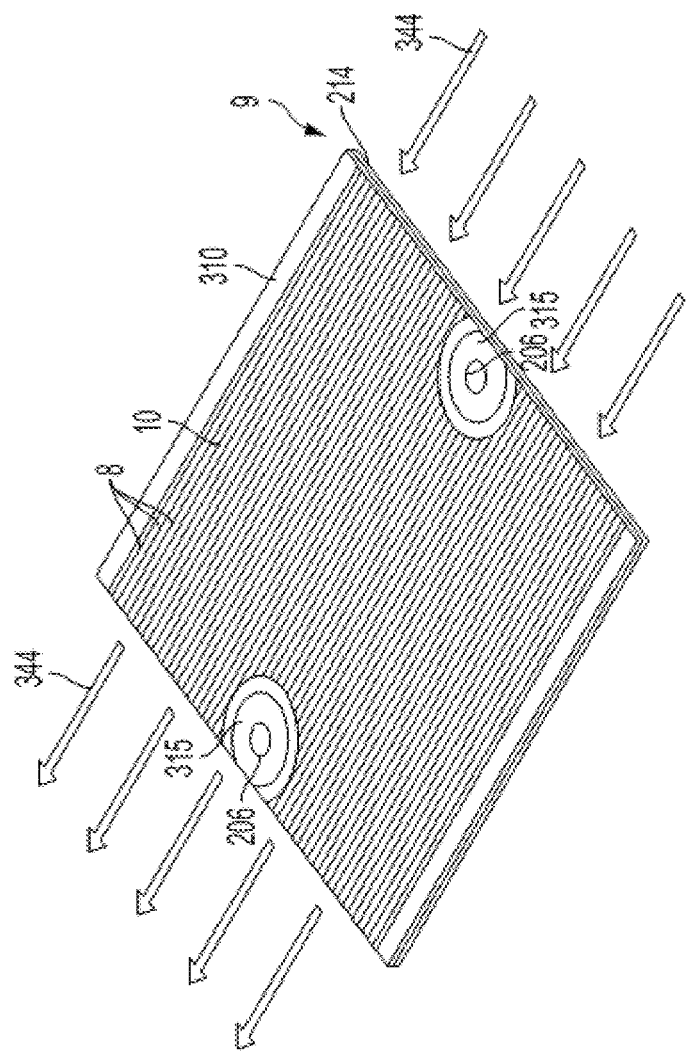
FIG. 3 is a three dimensional view of an air side of an embodiment interconnect for a SOFC stack with ring seals and strip seals.

FIG. 3 illustrates the air side of an interconnect which can include gas flow passages or channels 8 between ribs 10 which direct air flow 344 over the cathode electrode of the fuel cell. Seals 315 can seal the respective risers 206 on the air side of an interconnect and the air (cathode) side of the adjacent fuel cell in the stack to prevent fuel from reaching the cathode electrode of the fuel cell. The seals 315 may have a ring (e.g., "donut" or hollow cylinder) shape as shown so that the risers 206 extend through the hollow middle part of the respective seals 315. The seals 315 can include an elevated top surface for contacting against the flat surface of the adjacent SOFC 1. A peripheral seal 310 (e.g., a strip seal as shown in FIG. 3) can seal the anode-sides of the interconnect and fuel cell to prevent air from reaching the anode electrode of the fuel cell.

In FIG. 3, the riser channel openings 206 are shown as fuel inlet and fuel outlet openings in the interconnect 9. This interconnect is configured for a fuel cell stack which is internally manifolded for fuel, in which the fuel travels through the stack through fuel riser channels which are formed by mated openings through the stacked interconnects and fuel cells. However, if desired, the interconnect 9 may be configured for a stack which is externally manifolded for fuel. In this case, the top and bottom edges of the interconnect 9 would function as fuel inlet and outlet, respectively, for the fuel which flows externally to the stack. Furthermore, the interconnect 9 shown in FIG. 3 is configured for a stack which is externally manifolded for air. However, additional openings through the interconnect may be formed, such as on the left and right sides of the interconnect, for the interconnect to be configured for a stack which is internally manifolded for air.

Various embodiment methods may include stencil printing. In stencil printing, a stencil may be applied to a fuel cell or a fuel cell interconnect. Seal paste may be applied to the stencil. The seal paste may pass through any open space in the stencil and contact the fuel cell or interconnect behind the stencil. The stencil may be removed leaving a layer of seal paste on the fuel cell or interconnect in the shape of the open space or spaces on the stencil.

Figure 4:
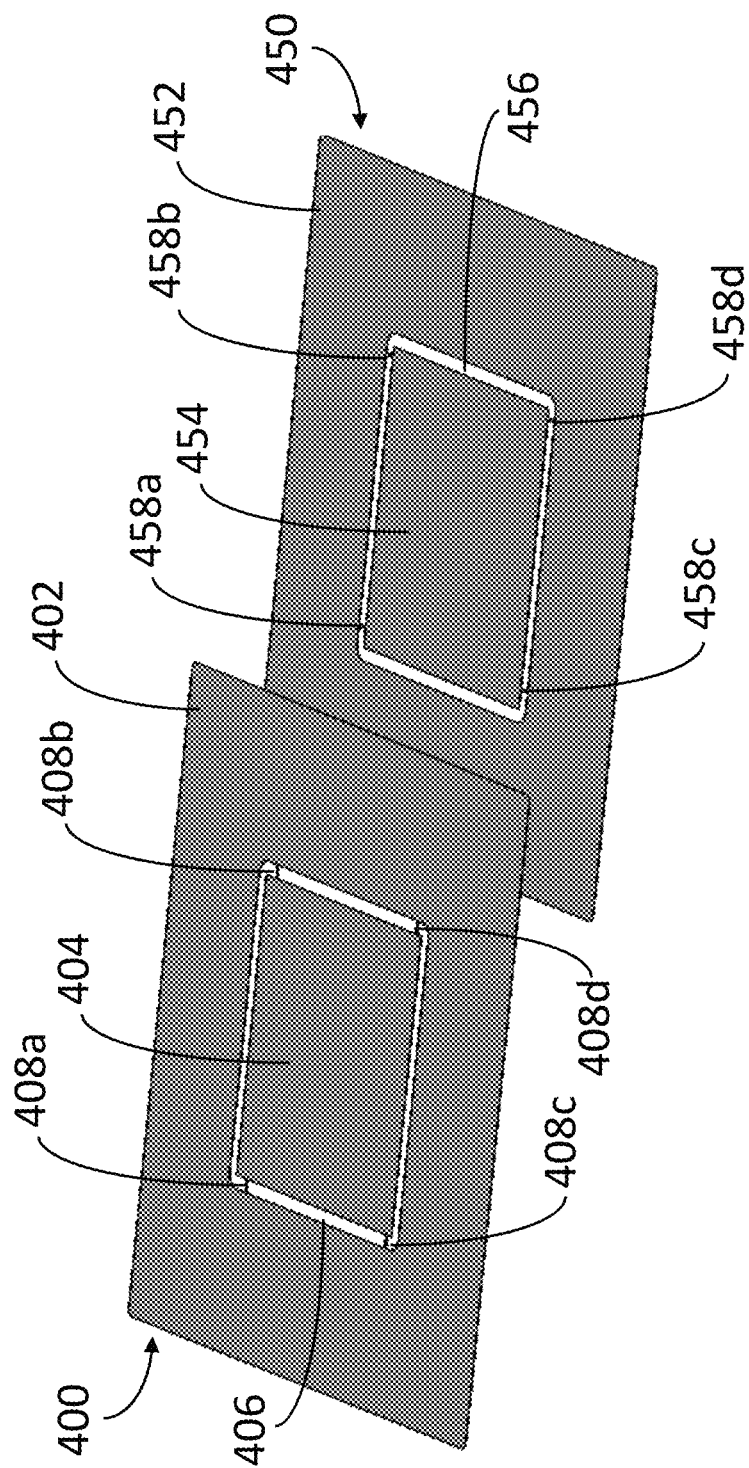
FIG. 4 is a three dimensional view of two stencils that may be used in various embodiment methods.

FIG. 4 illustrates embodiment stencils that may be used to apply a seal. A first stencil 400 may include a solid outer portion 402 and a solid inner portion 404 connected by one or more webbing(s) 408a, 408b, 408c, 408d. In various embodiments, the webbings may be one or more wires, thin rods, or any other narrow strip of material to connect the outer and inner portions. The stencil may be made of various materials, such as a metal. An open space 406 may be defined between the inner portion 404 and the outer portion 402. The dimensions of the space 406 may correspond to the seal to be applied (i.e., the space 406 may have the same length, width, and height of the desired seal). During printing, seal paste may be applied to the stencil 400 and fill the space 406. After the stencil 400 is removed, the applied seal paste may remain in the shape of the space 406.

FIG. 4 also illustrates a second stencil 450. Like the first stencil 400, the second stencil 450 may include a solid outer portion 452 and a solid inner portion 454 separated by a space 456 and connected by one or more webbing(s) 458a, 458b, 458c, 458d. However, the webbings 458a, 458b, 458c, 458d may be located in different positions than the webbings 458a, 458b, 458c, 458d of the first stencil. By using both stencils 400, 450 a seal may be applied without gaps corresponding to the webbing of either stencil.

In various embodiments, seal paste may be applied by stencil printing with a first stencil 400. Gaps in the seal paste may exist due to the webbings 408a-d of the first stencil. A second stencil 450 with different webbing locations may be used to apply seal paste again to the same location on the fuel cell or interconnect and fill the gaps.

In various embodiments, the first and second stencils may have openings (e.g., the open space 406, 456) with the same shape except for the different arrangement of webbings.

Figure 5:
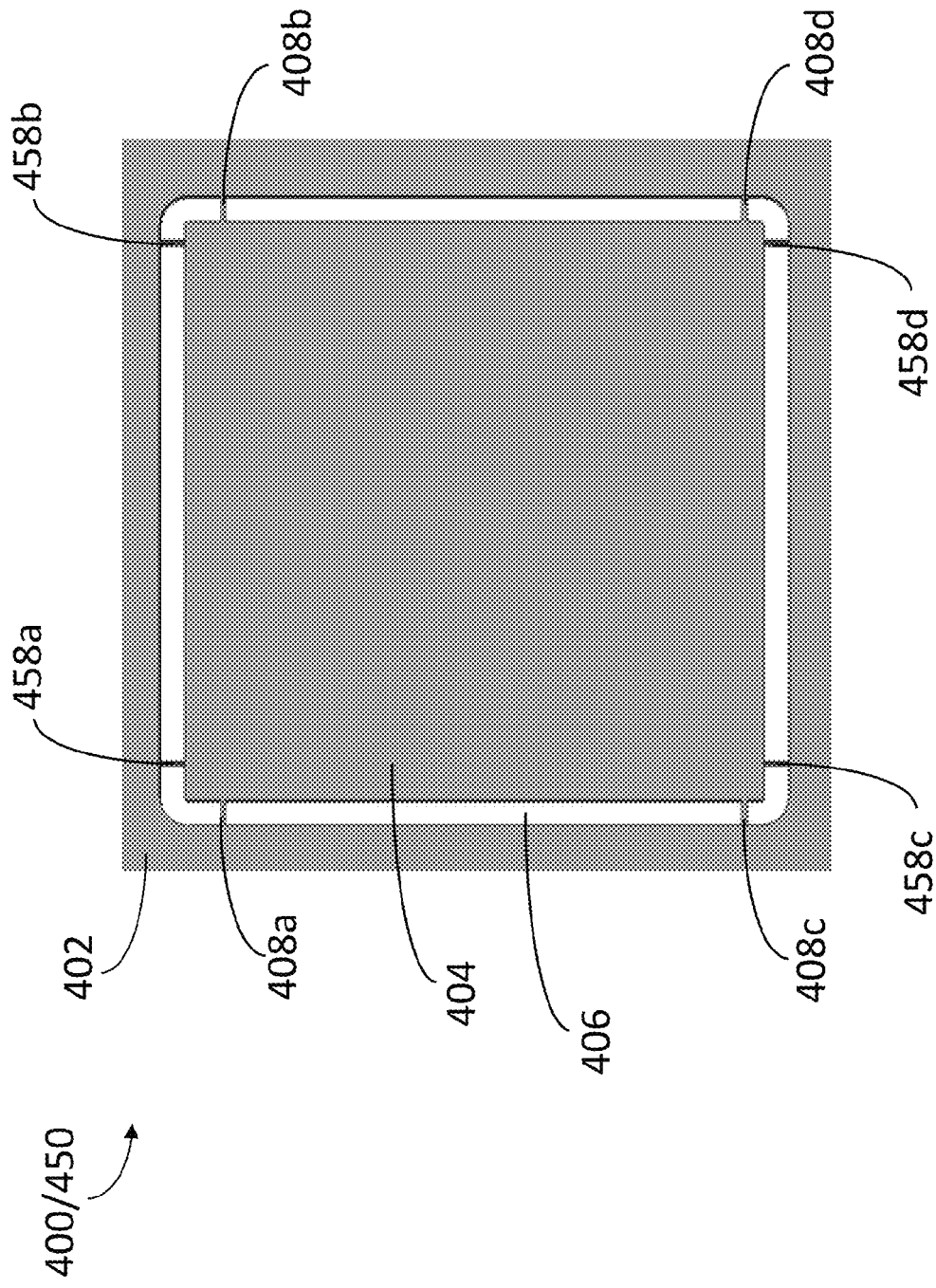
FIG. 5 is a top view of two overlaid stencils showing the difference in webbings.

For example, FIG. 5 illustrates two overlaid stencils with differently arranged webbings. A first stencil 400 may be on top of the second stencil 450 (not visible in FIG. 5 except for webbings 458a, 458b, 458c, 458d). This configuration of a stencil on top of another stencil is preferably not used in practice for stencil printing in various embodiments, but illustrates how the first webbings of the first stencil are arranged differently than the second webbings of the second stencil. The first stencil 400 may include an outer portion 402 and an inner portion 404 separated by a space 406 and connected by webbings 408a, 408b, 408c, 408d. The webbings 458a, 458b, 458c, 458d of the second stencil may be seen through the space 406 and are in different locations the webbings 408a, 408b, 408c, 408d of the first stencil 400.

Figure 6:
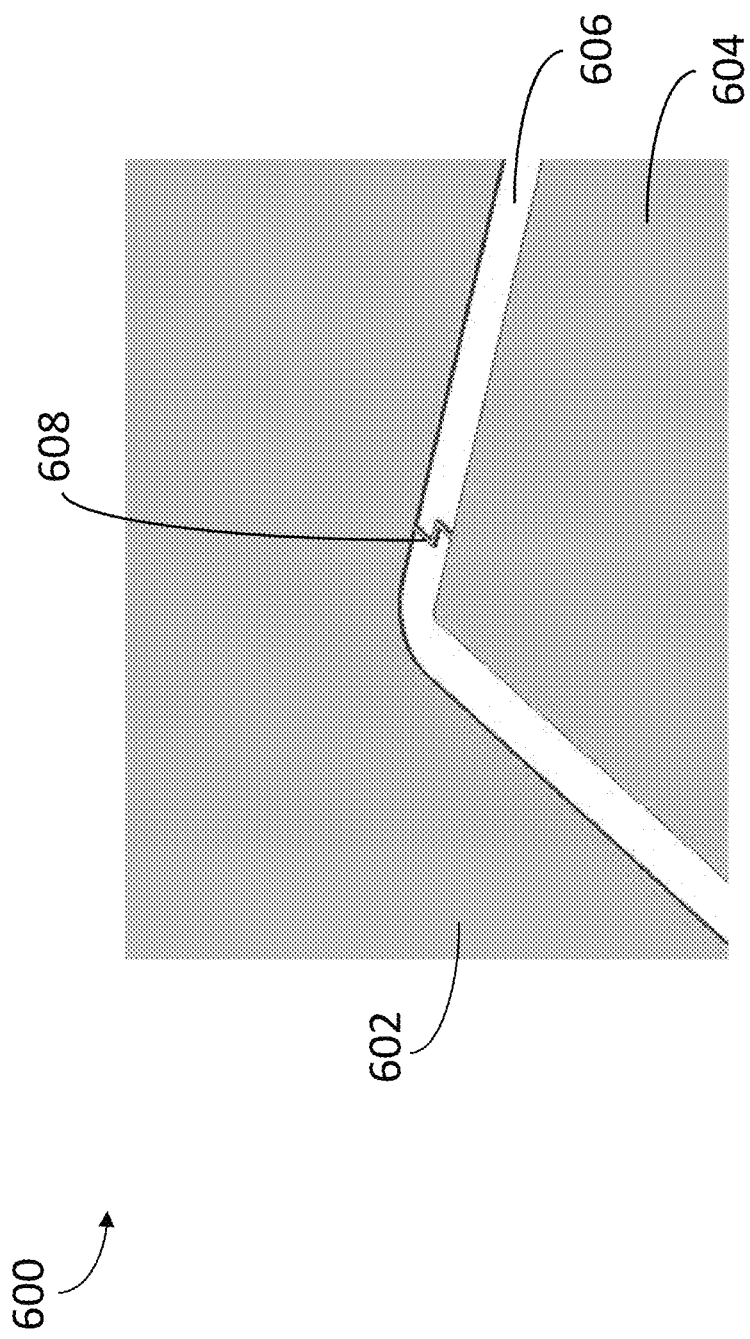
FIG. 6 illustrates an embodiment stencil with an alternate webbing with a tortuous path shape.

FIG. 6 illustrates an alternate embodiment webbing. A stencil 600 may have an outer portion 602 and an inner portion 604 separated by a space 606 and connected by any number of webbings 608. The webbing 608 may be various shapes, such as a tortuous path as shown in FIG. 6, and may provide better filling capabilities. In various embodiments, multiple shapes or types of webbings may be part of a single stencil. In alternate embodiments, the spaces 406, 606 may be filled with a mesh or screen that allows seal paste to pass through.

Figure 7:
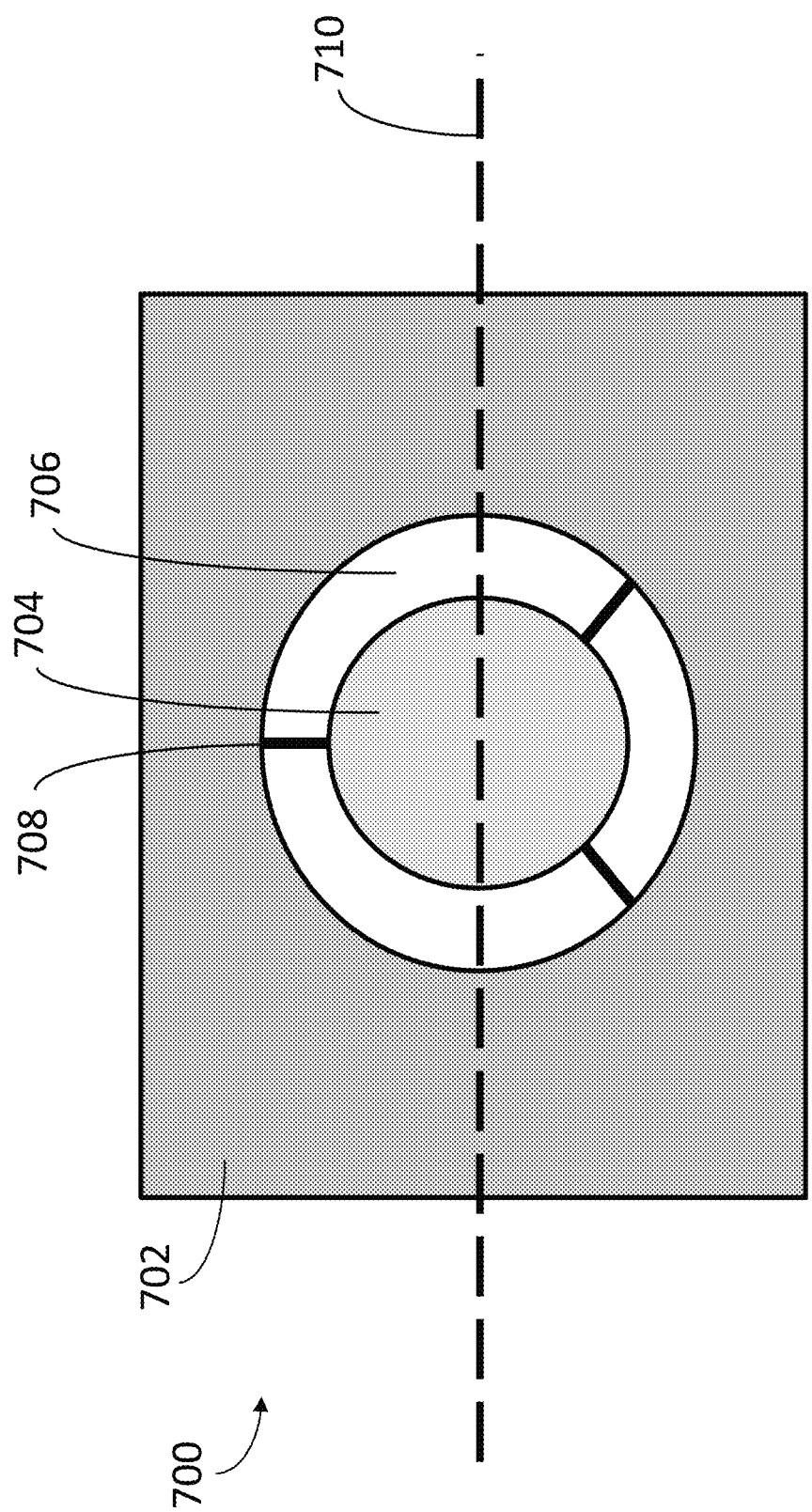
FIG. 7 illustrates an embodiment stencil for a ring seal which may be rotated or flipped for further stencil printing.

FIG. 7 illustrates a stencil that may be used in various embodiments for forming ring or donut shaped seals. The stencil 700 may include an outer portion 702 and an inner portion 704 separated by a space 706 and connected by any number of webbings 708.

In further embodiments, a stencil may be rotated and reused. If the desired shape of the seal is symmetric about one or more axis, the same stencil may be repositioned and used for a second stencil print. For example, the stencil 700 of FIG. 7 may be used to form a circular seal. Because a circle is symmetric about an axis passing through the center of the circle, such as axis 710, the stencil may be rotated or flipped over and used for second screen printing. The webbings 708 of stencil 700 may leave gaps after a first stencil printing, but the stencil 700 may be flipped about axis 710 to fill the gaps in a second stencil printing. Alternately, the stencil 700 may be rotated about the center of the circle such that the webbings 708 are not located in the same position as in the first stencil printing. A second stencil printing may be applied in the new position to fill any gaps from the previous printing.

Figure 8:
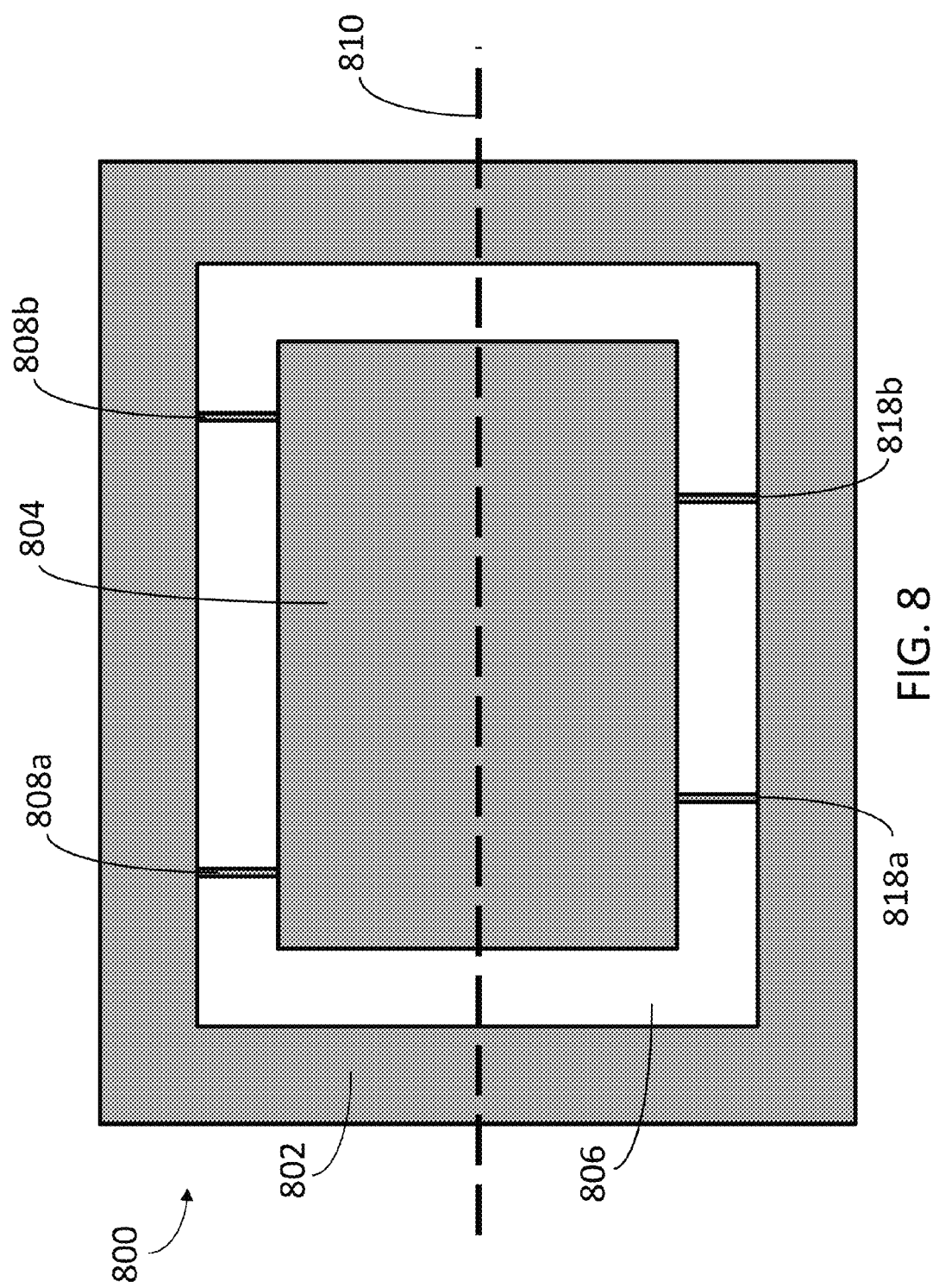
FIG. 8 illustrates an embodiment stencil with asymmetric webbings that may be rotated or flipped for further stencil printing.

FIG. 8 illustrates another stencil 800 that may be reused to fill gaps in an earlier stencil print. The stencil 800 may include an outer portion 802 and an inner portion 804 separated by a space 806 and connected by webbings 808a, 808b, 818a, 818b. The desired seal shape (which corresponds to the space 806) may be symmetric about an axis 810. The stencil 800 may be asymmetric about the axis 810 such that a first set of webbings 808a, 808b do not align with a second set of webbings 818a, 818b (i.e., the desired seal is symmetric about the axis, but the stencil webbings are not). The stencil 800 may be used for a first stencil printing then flipped 180 degrees about the axis 810 or rotated 180 degrees in the plane of the axis 810 such that the webbings 808a, 808b, 818a, or 818b do not align with any gaps from the first stencil printing. A second stencil printing may be performed with the stencil 800 in the new position to fill the gaps.

Figure 9:
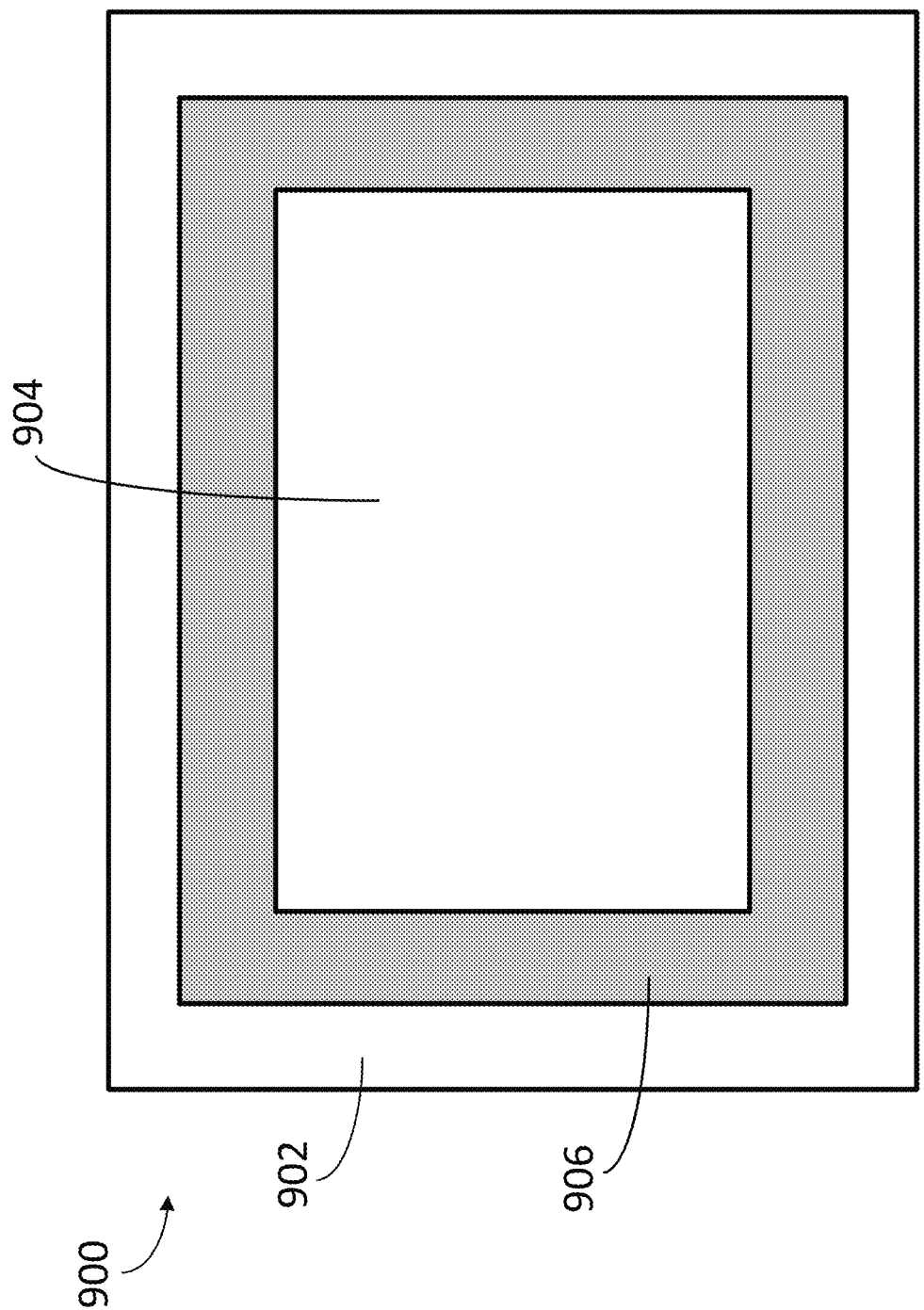
FIG. 9 illustrates an embodiment screen for applying seal paste to fuel cell components by screen printing

Various embodiments may include screen printing, such as screen printing the seal paste on the fuel cell rather than on the interconnect. FIG. 9 illustrates a screen 900 for screen printing. The device may include a screen material 906 that allows seal paste to pass through, such as a mesh or fabric. The screen 900 may include one or more covered sections that do not allow seal paste to pass through. For example, as shown in FIG. 9, an inner portion 904 and an outer portion 902 may block or cover parts of the screen 900. The inner portion 904 and outer portion 902 may be made of various materials, such as an emulsion.

During screen printing, the screen 900 may be applied to a fuel cell or interconnect. When seal paste is applied, the seal paste may pass through the screen material 906 to the fuel cell or interconnect behind the screen 900. The inner portion 904 and outer portion 902 may block the seal paste. The screen 900 may be removed and the result may be an application of seal paste in the shape of the material 906.

Figure 10:
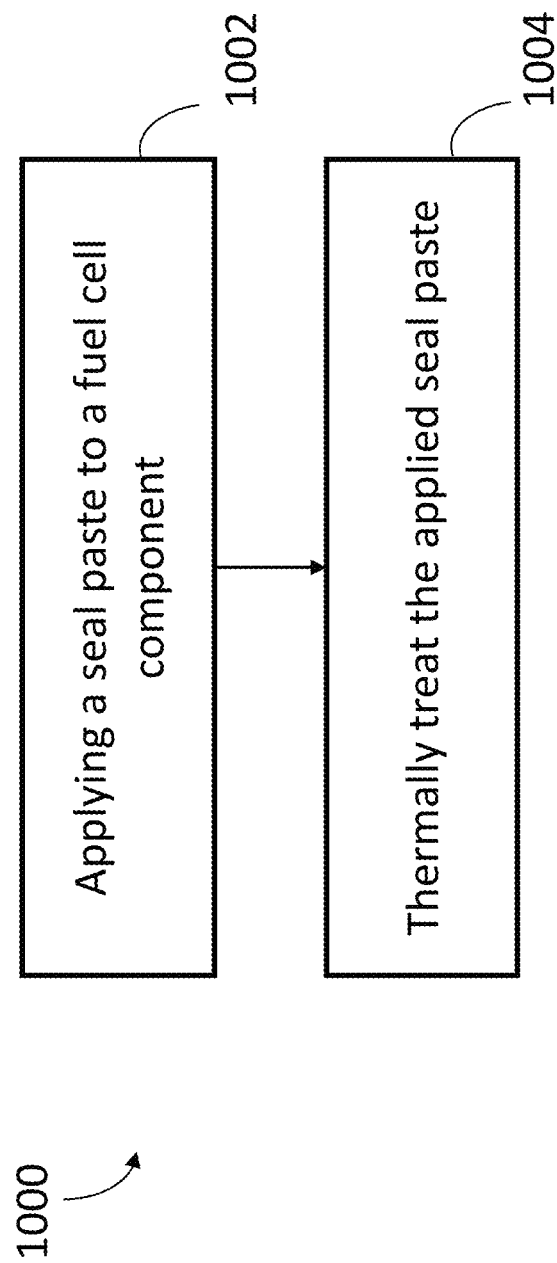
FIG. 10 is a process flow diagram of an embodiment method of applying a fuel cell seal.

FIG. 10 illustrates an embodiment method 1000 for printing seals. In operation 1002, seal paste may be applied to a fuel cell component, such as to a fuel cell or an interconnect. For example, seal paste may be applied by stencil printing, screen printing, or dispensing from a nozzle. In operation 1004, the applied seal paste may be thermally treated to prepare the seal paste for use. The seal paste may be heated and/or exposed to an oxidizing or reducing environment to prepare it for use. For example, the fuel cell or interconnect with the applied seal paste may be placed into a fuel cell stack arrangement, as shown in FIG. 1, and the fuel cell stack may then be heated at a temperature of at least 900° C., such as 900-950° C. for 1-10 hours (e.g., 2-5 hours) to melt and set the seal(s).

Figure 11:
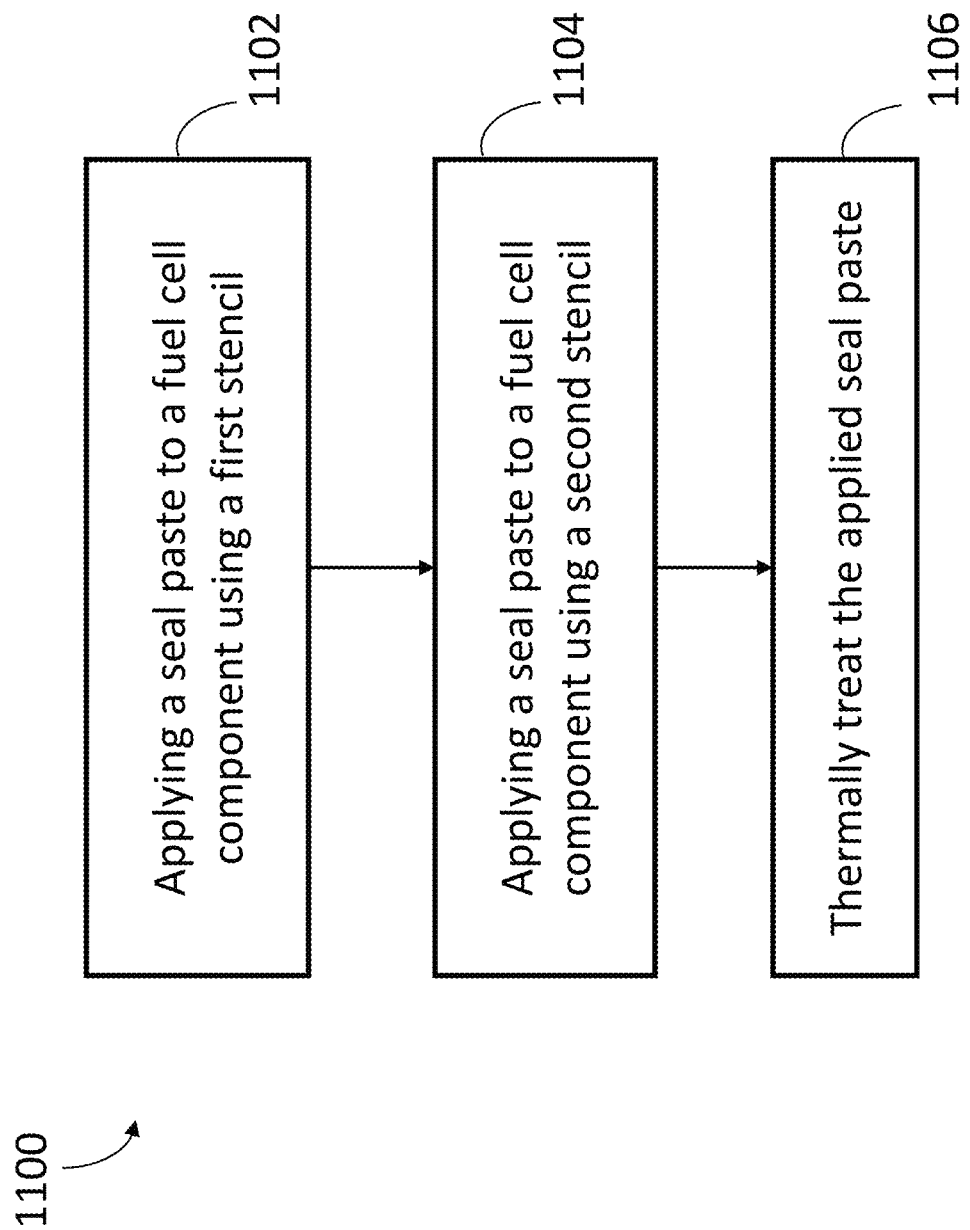
FIG. 11 is a process flow diagram of an embodiment method of applying a fuel cell seal by stencil printing multiple times.

FIG. 11 illustrates an embodiment method 1100 of stencil printing with multiple applications. In operation 1102, seal paste may be applied to a fuel cell component, such as a fuel cell or interconnect, using a first stencil (e.g., first stencil 400). Seal paste may be applied to the fuel cell component using a second stencil (e.g., second stencil 450) in operation 1104. In various embodiments, the second stencil may be the same stencil as the first stencil but with the stencil rotated or flipped such that the stencil's webbings do not align with any gaps in the previously applied seal paste, such as described above with respect to FIGS. 5, 7, and 8. In operation 1106, the applied seal paste may be thermally treated as described above.

Figure 12:
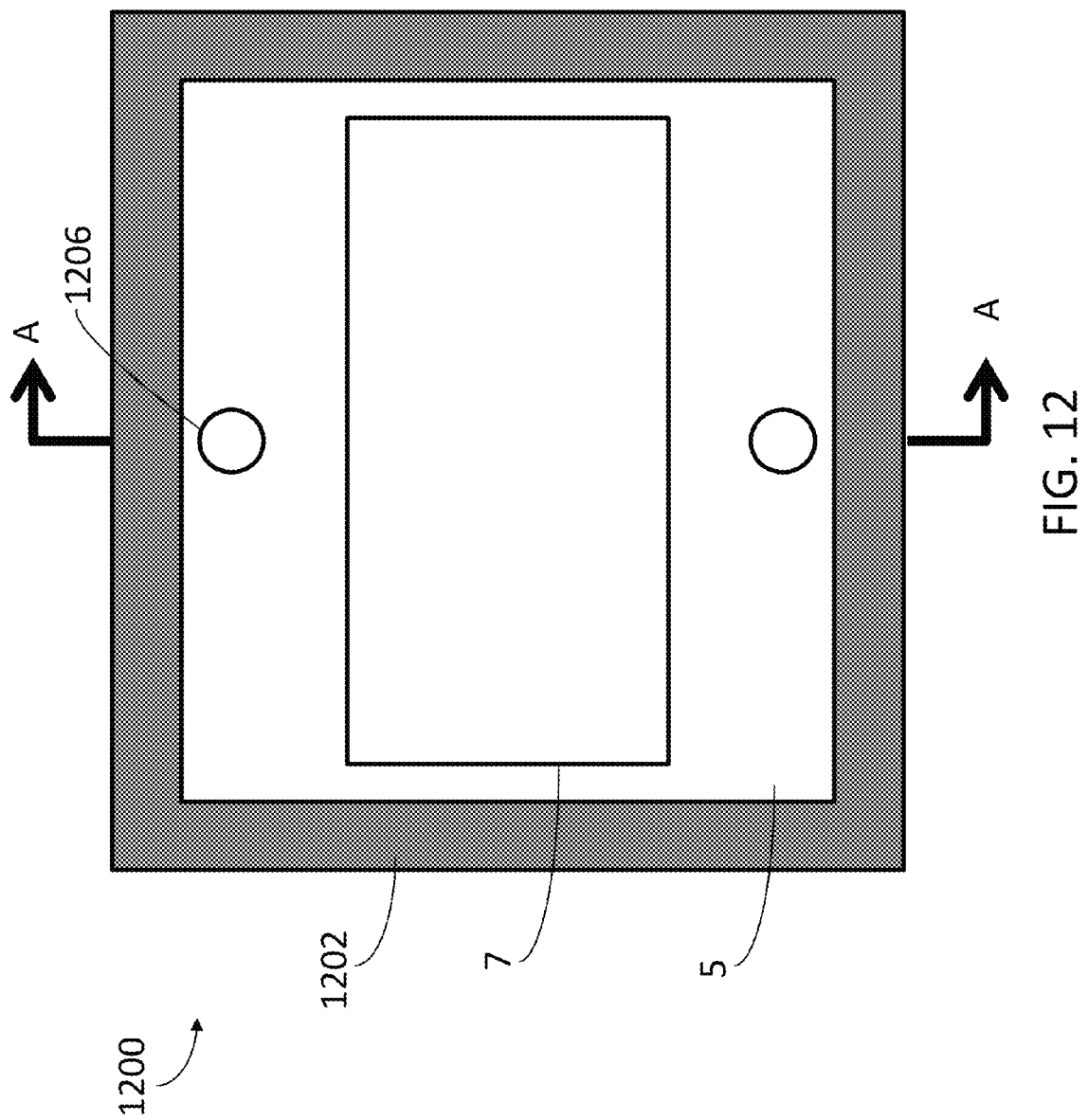
FIG. 12 is a top view of a fuel cell with seal paste applied in a hollow rectangle shape.
Figure 13:
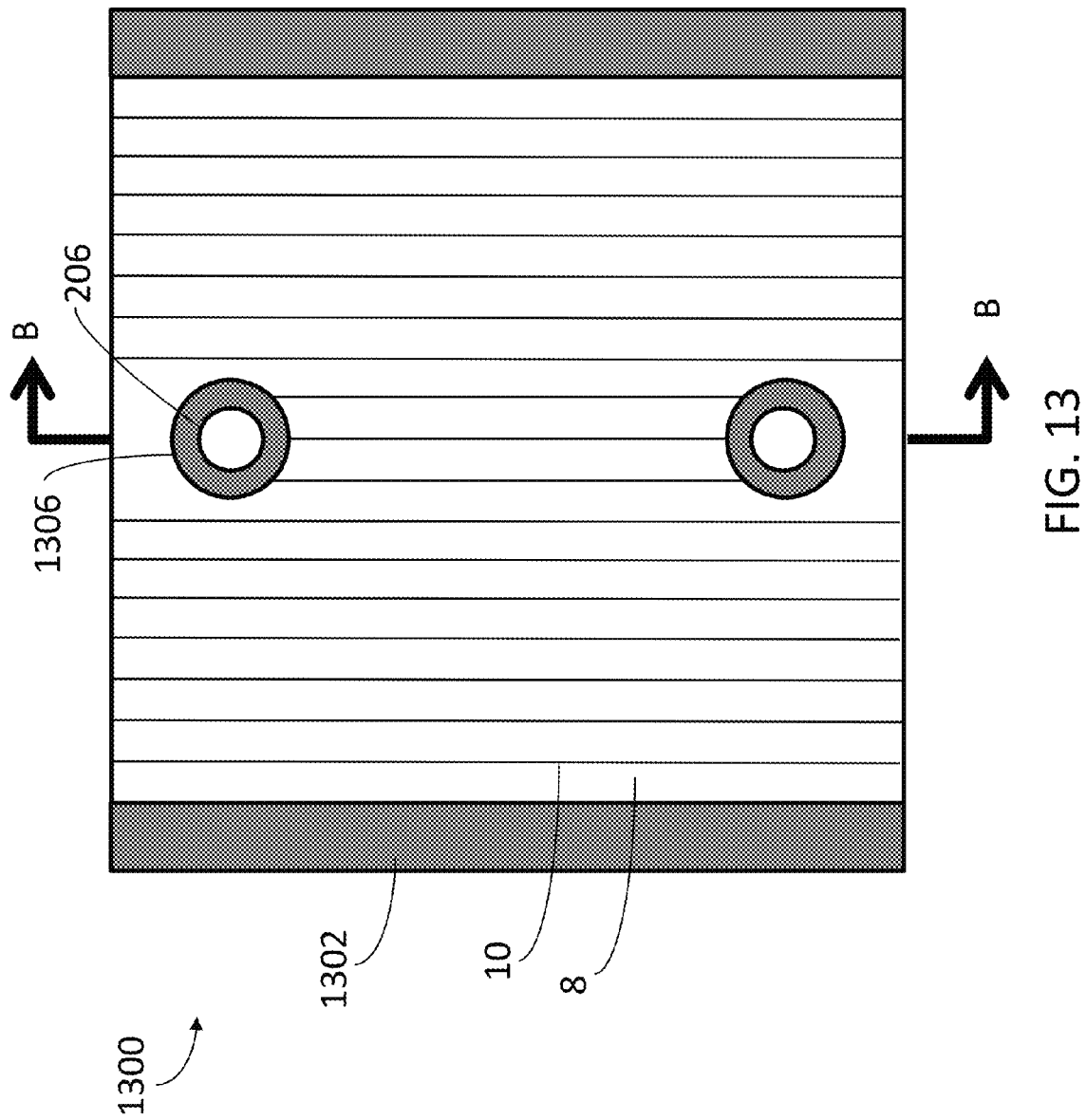
FIG. 13 is a top view of an interconnect with seal paste applied in ring shapes and strip shapes.
Figure 14:
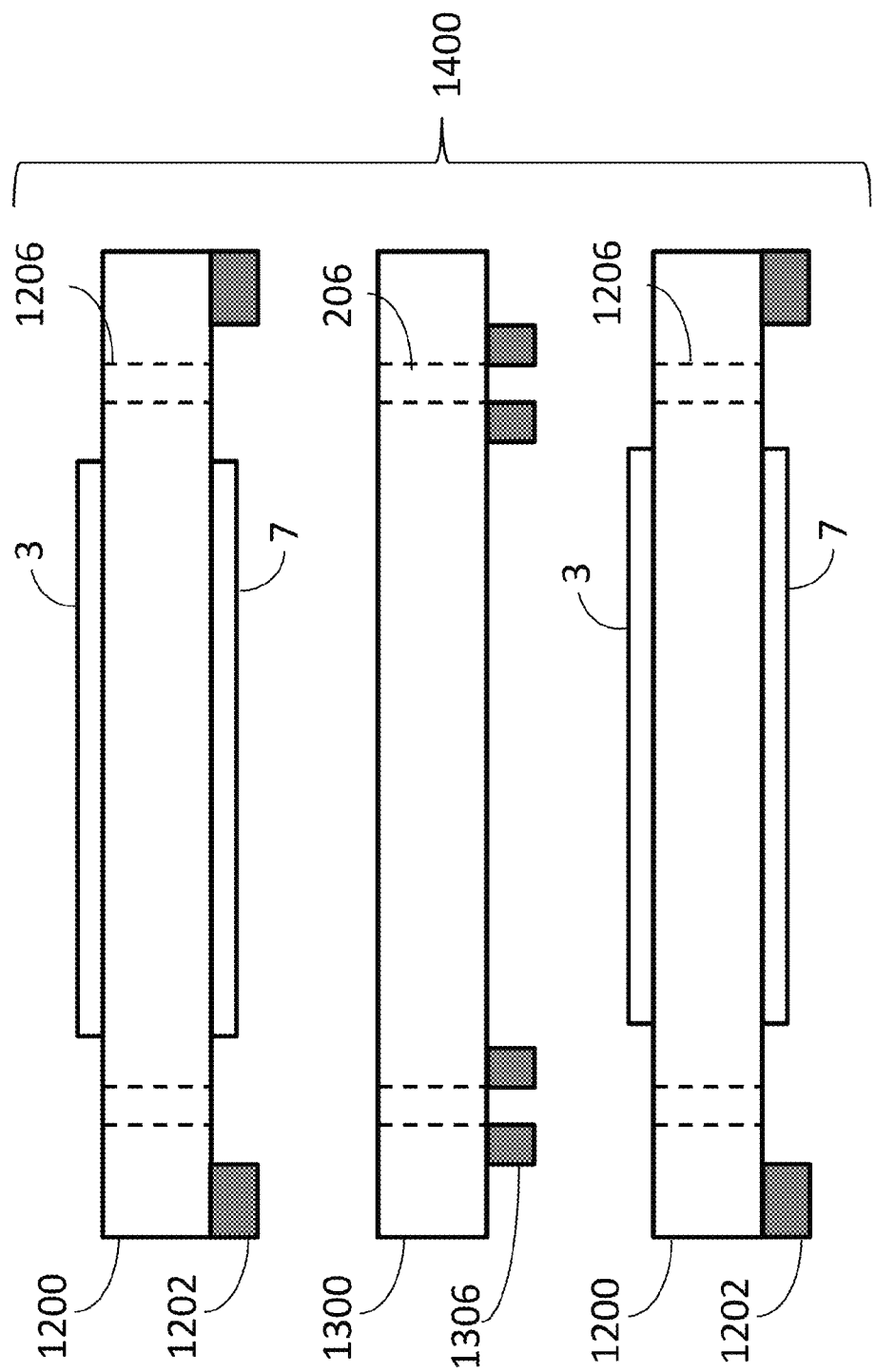
FIG. 14 is a side cross sectional view of fuel cells and interconnects with seal paste portions located in a fuel cell stack.

In various embodiments, fuel cell stack seals may be created by applying seal paste to multiple components, assembling the components into a fuel cell stack, and treating all of the components together. For example, FIG. 12 illustrates a fuel cell 1200 with an electrolyte 5, anode electrode 7, fuel risers 1206, and seal paste 1202 applied for forming a window seal. FIG. 13 illustrates an interconnect 1300 with ribs 10 between gas flow passages 8, risers 206 surrounded by seal paste 1306 applied for a ring seal, and seal paste 1302 applied for forming strip seals. Fuel cells 1200 and interconnects 1300 may be stacked in series to form a fuel cell stack 1400, as shown in FIG. 14. FIG. 14 illustrates an exploded side cross sectional view of the fuel cells 1200 and interconnects 1300 in the stack 1400 along the lines A-A and B-B in FIGS. 12 and 13, respectively. The exploded schematic view shows the fuel cells and interconnects not in physical contact to show the initial location of the seal paste. It should be understood that each seal contacts both the adjacent fuel cell and adjacent interconnect in the stack 1400. The risers 1206, 206 are shown with dotted lines. The seal paste 1202 applied for forming a window seal that goes all the way around the fuel cells 1200 is shown only at the edges. Similarly, the seal paste 1306 applied for forming ring seals is shown only at the edge of the risers 206 of the interconnect. The seal paste 1302 applied for forming strip seals is not shown in FIG. 14. Once the fuel cells 1200 and interconnects 1300 are brought together to assemble a fuel cell stack 1400 (i.e., the applied seal paste 1202, 1302, 1306 contacts the adjacent component), the fuel cell stack may be thermally treated (e.g., heated such that the binder burns out and the seal paste sets and becomes seals).

FIGS. 12, 13, and 14 illustrate seal paste applied to the fuel side of fuel cells and to the air side of interconnects, but in further embodiments this may be reversed. Thus seal paste may be applied to the air side of a fuel cell and the fuel side of an interconnect, to both the air side and fuel side of a fuel cell, or to both the air side and fuel side of an interconnect.

Figure 15:
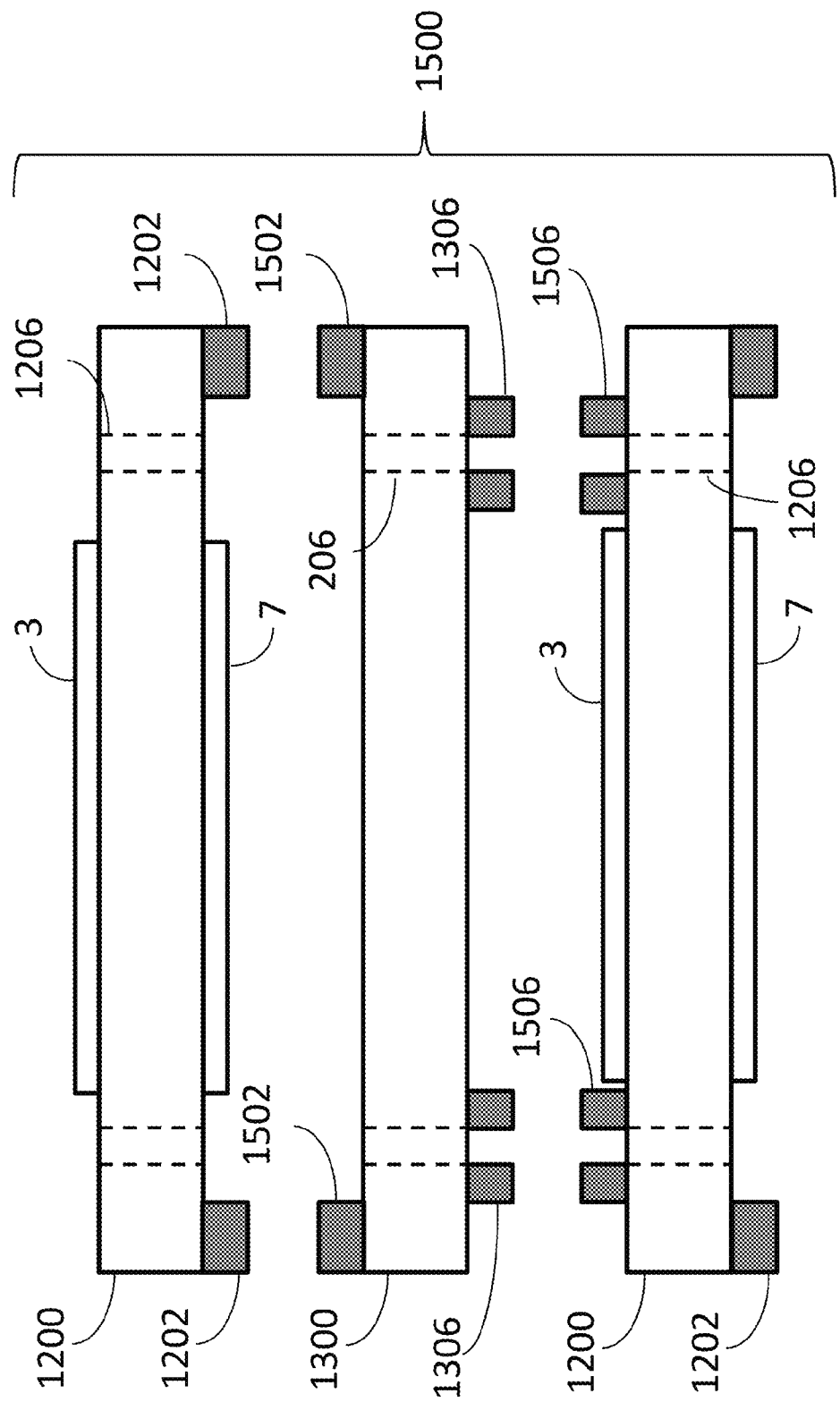
FIG. 15 is a side cross sectional view of fuel cells and interconnects with complementary seal paste portions located in a fuel cell stack.

In further embodiments, portions of seal paste may be applied to a fuel cell and an interconnect by any of the methods described above and the portions may form a full seal together when the fuel cell and interconnect are joined to form the fuel cell stack 1500. FIG. 15 illustrates a similar exploded schematic side cross sectional view of fuel cells 1200 and interconnects 1300 as in FIG. 14 except that FIG. 15 includes complementary seal paste portions. The interconnect 1300 may have first complementary seal paste portions 1502 to match the seal paste 1202 applied for forming a window seal on the adjacent fuel cell 1200 in the fuel cell stack 1500. The fuel cell 1200 may have second complementary seal paste portions 1506 to match the seal paste 1306 applied for forming ring seals on the adjacent interconnect 1300. The seal paste 1302 applied for forming strip seals is not shown but the fuel cell may also have complementary portions to form strip seals. Once the fuel cells 1200 and interconnects 1300 are brought together to assemble the fuel cell stack 1500, the complementary portions 1502, 1506 may contact the seal paste portions 1202, 1306 on the adjacent fuel cells and together form respectively window and ring seals when thermally treated.

In various embodiments, the seal paste portions are located on respective fuel sides of the fuel cell and the interconnect or on respective air sides of the fuel cell and the interconnect For example, complementary seal paste portions 1306 and 1506 are on separate components (i.e., portion 1306 is on the interconnect and portion 1506 is on the fuel cell), but both portions 1306, 1506 are on the air side of the respective component. Complementary seal paste portions may contact each other when placed into the fuel cell stack and may form a common seal together when the stack is thermally treated.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of forming a seal on a fuel cell, comprising:
   placing a first stencil having a first open space and first solid webbings on the fuel cell, the first open space defining a shape of the seal;
   applying a first seal paste to the first stencil to fill the first open space, the first solid webbings occupying first locations in the first open space filled with the first seal paste;

removing the first stencil from the fuel cell to expose the first locations that were occupied by the first solid webbings, gaps appearing at the first locations in the first seal paste;

placing a second stencil having a second open space and second solid webbings on the fuel cell, the second stencil being placed such that the first seal paste is within the second open space and the second solid webbings occupy second locations different from the first locations where gaps appear in the first seal paste;

applying a second seal paste to the second stencil to fill the second space, including the gaps;

removing the second stencil;

placing the fuel cell in a fuel cell stack; and thermally treating the fuel cell stack to set the first and second seal pastes into the seal.

2. The method of claim 1, wherein the first stencil comprises a solid outer portion and a solid inner portion connected by the first solid webbings, the solid outer portion and the solid inner portion defining the first open space.

3. The method of claim 1, wherein the second stencil comprises a solid outer portion and a solid inner portion connected by the second solid webbings, the solid outer portion and the solid inner portion defining the second open space.

4. The method of claim 1, wherein the fuel cell stack is a solid oxide fuel cell stack containing solid oxide fuel cells.

5. The method of claim 1, wherein the first open space, the shape of the seal, and the second open space are of a hollow rectangle shape, a ring shape, or a strip shape.

6. A method of forming a seal on an interconnect, comprising:
placing a first stencil having a first open space and first solid webbings on the interconnect, the first open space defining a shape of the seal;

applying a first seal paste to the first stencil to fill the first open space, the first solid webbings occupying first locations in the first open space filled with the first seal paste;

removing the first stencil from the interconnect to expose the first locations that were occupied by the first solid webbings, gaps appearing at the first locations in the first seal paste;

placing a second stencil having a second open space and second solid webbings on the interconnect, the second stencil being placed such that the first seal paste is within the second open space and the second solid webbings occupy second locations different from the first locations where gaps appear in the first seal paste;

applying a second seal paste to the second stencil to fill the second space, including the gaps;

removing the second stencil;

placing the interconnect in a fuel cell stack; and thermally treating the fuel cell stack to set the first and second seal pastes into the seal.

7. The method of claim 6, wherein the first stencil comprises a solid outer portion and a solid inner portion connected by the first solid webbings, the solid outer portion and the solid inner portion defining the first open space.

8. The method of claim 6, wherein the fuel cell stack is a solid oxide fuel cell stack containing solid oxide fuel cells.

9. The method of claim 6, wherein the first open space, the shape of the seal, and the second open space are of a hollow rectangle shape, a ring shape, or a strip shape.

10. The method of claim 6, wherein the second stencil comprises a solid outer portion and a solid inner portion connected by the second solid webbings, the solid outer portion and the solid inner portion defining the second open space.

11. A method of forming a seal on a fuel cell component, comprising:
placing a stencil having an open space and solid webbings on the fuel cell component, the open space defining a shape of the seal;

applying a first seal paste to the stencil to fill the open space, the solid webbings occupying first locations in the open space filled with the first seal paste;

re-arranging the stencil to move the solid webbings to second locations different from the first locations, gaps appearing at the first locations in the first seal paste;

applying a second seal paste to the stencil to fill the open space, including the gaps;

removing the stencil;

placing the fuel cell component in a fuel cell stack; and thermally treating the fuel cell stack to set the first and second seal pastes into the seal.

12. The method of claim 11, wherein re-arranging the stencil comprises rotating the stencil.

13. The method of claim 11, wherein the seal is symmetric about an axis.

14. The method of claim 13, wherein re-arranging the stencil comprises flipping the stencil 180 degrees about the axis of the seal.

15. The method of claim 13, wherein the solid webbings on the stencil are not symmetric about the axis of the seal.

16. The method of claim 11, wherein the fuel cell component is a fuel cell.

17. The method of claim 11, wherein the fuel cell component is an interconnect.

* * * * *